(12) United States Patent
Gardner et al.

(10) Patent No.: US 11,767,375 B2
(45) Date of Patent: Sep. 26, 2023

(54) AMINOCARBOXYLIC ACID-FUNCTIONALIZED SACCHARIDE POLYMERS AND METHODS FOR PRODUCTION AND USE THEREOF

(71) Applicant: INTEGRITY BIO-CHEMICALS, LLC, Cresson, TX (US)

(72) Inventors: Christopher P. Gardner, Cresson, TX (US); Stephen William Almond, Creston, CA (US)

( * ) Notice: Subject to any disclaimer, the term of this patent is extended or adjusted under 35 U.S.C. 154(b) by 0 days.

(21) Appl. No.: 18/246,161

(22) PCT Filed: Oct. 14, 2022

(86) PCT No.: PCT/US2022/078089
§ 371 (c)(1),
(2) Date: Mar. 21, 2023

(87) PCT Pub. No.: WO2023/069870
PCT Pub. Date: Apr. 27, 2023

(65) Prior Publication Data
US 2023/0272122 A1    Aug. 31, 2023

Related U.S. Application Data

(60) Provisional application No. 63/256,817, filed on Oct. 18, 2021.

(51) Int. Cl.
C08B 37/00    (2006.01)
B03D 1/016    (2006.01)

(52) U.S. Cl.
CPC .......... *C08B 37/0003* (2013.01); *B03D 1/016* (2013.01)

(58) Field of Classification Search
None
See application file for complete search history.

(56) References Cited

U.S. PATENT DOCUMENTS

| 2009/0272693 A1 | 11/2009 | Mabille et al. |
| 2018/0340120 A1 | 11/2018 | Madduri et al. |

FOREIGN PATENT DOCUMENTS

| WO | 2021006933 A1 | 1/2021 |
| WO | 2021011736 A1 | 1/2021 |

OTHER PUBLICATIONS

Na, Y. et al., "Removal of heavy metals by polysaccharide: a review," Polymer-Plastics Technology and Materials, 2020, pp. 1770-1790, 59.
Written Opinion and International Search Report from corresponding PCT Application No. PCT/US2022/078089 dated Feb. 8, 2023.

*Primary Examiner* — Peter Keyworth
(74) *Attorney, Agent, or Firm* — Vorys, Sater, Seymour and Pease LLP

(57) ABSTRACT

Fluid contaminants may be prevalent in many industries, such as the mining industry. Functionalized saccharide polymers comprising two or more monosaccharide units linked by glycosidic bonds and having a portion of the monosaccharide units oxidatively opened and functionalized with at least one aminocarboxylic acid covalently bound through nitrogen at a site of oxidative opening may be utilized in conjunction with fluid remediation processes, such as froth flotation. In non-limiting examples, the functionalized saccharide polymers may also be useful for promoting dust control, particulate coating, clay stabilization, and various subterranean treatment operations. Glycine represents one example of an aminocarboxylic acid that may be covalently bonded through nitrogen at a site of oxidative opening.

20 Claims, No Drawings

AMINOCARBOXYLIC ACID-FUNCTIONALIZED SACCHARIDE POLYMERS AND METHODS FOR PRODUCTION AND USE THEREOF

BACKGROUND

Contaminated fluids may be encountered in a variety of settings. Froth treatments may be used in the petroleum and mining industries, among others, in order to remediate a fluid and increase the value of a resource obtained therefrom. In addition to the petroleum and mining industries, froth treatments may also find significant use in drinking and wastewater treatment operations, and in fermentation processes. Flocculation treatments also may be used to promote remediation of contaminated fluids but differ from froth treatments in the location where remediated material is obtained.

Purification processes such as flocculation and frothing utilize a flocculating agent or frothing agent, respectively, to promote formation of a phase for sequestering a contaminant from a fluid in need of contaminant removal, thereby facilitating up-conversion of a substance therein. In the case of frothing, the substance is obtained as a more-dense phase, also referred to as a gangue, that is separable from a less-dense froth, thereby allowing contaminant removal to take place within the froth. Flocculation processes, in contrast, produce dense flocs sequestering one or more contaminants that may similarly allow separation of a desired substance as a less-dense phase (e.g., by decantation).

Conventional flocculants may include, for example, organic flocculants, such as polyacrylamide derivatives; inorganic flocculants, such as aluminum salts and ferric salts; and biopolymers, such as chitosan, humic acid and alginates. A given flocculant may be selected based upon the type of substance in need of up-conversion and the particular contaminant being removed. For flocculants of all types, the flocculants may agglomerate into larger particle sizes and colloids once exposed to a contaminant, thereby allowing separation of a desired material from flocculated contaminants to be realized through sedimentation. Alternately, a desired material may be sedimented and separated from a non-flocculated contaminant, and then undergo separation from the flocculant. Many types of organic and inorganic flocculants may exhibit a less desirable environmental profile than do biopolymer-derived flocculants. Low yields, poor flocculating efficiencies and high production costs compared to organic and inorganic flocculants may be problematic for some biopolymer flocculants.

Froth treatments differ from flocculation in that one or more frothing agents may sequester a particulate material and change the wetting properties such that the particulate material floats in the form of a froth. Frothing agents may be neutral, cationic, or anionic in nature and may make a particulate material more hydrophobic, optionally aided by one or more collectors, in the course of promoting frothing. Like flocculants, there may be limitations associated with conventional frothing agents.

In a particular example, froth treatments may be used to sequester minerals and water from bitumens mined from oil sands to leave the bitumen in a condition suitable for processing into a more valuable hydrocarbon resource. Froth treatments may also be used in conjunction with traditional mining activities as well. Heavy metals, such as lead, mercury and arsenic, for example, may commonly be present in the runoff from traditional mining activities, including those conducted for obtaining precious metals, such as gold, silver or platinum, or non-precious metals, such as copper. Indeed, in the case of a low productivity mine, the quantity of heavy metals liberated as waste may exceed the amount of desired metals obtained. The heavy metals liberated from mining activities can have significant environmental and health consequences for the surrounding environment and the people and animals living there.

An additional engineering issue commonly occurring in the mining industry is that of dust control, wherein the dust results from fines generated during the mining process. Fines may be present in combination with a plurality of particulates having a larger average size on the whole. Fines can result in numerous issues ranging from being a mere nuisance to those of extreme safety. For example, aerosolized dust particles in mining operations and other industries can represent an extreme inhalation and fire hazard.

A number of engineering approaches may be used to limit dust production in mining operations and other industrial processes. Among the approaches that may be used include, for example, ventilation, water sprays, water curtain barriers, physical barriers, and the like. Unfortunately, these engineering approaches may provide limited success for controlling dust and similar fines, and they may not be universally applicable for all situations. Moreover, some of the foregoing approaches may be rather expensive to implement relative to the benefits gained therefrom.

Another approach for mitigating the presence of fines involves applying a coating to a particulate material, thereby tempering the ability of the fines to aerosolize into dust particles. Coatings can represent one of the more effective approaches available for limiting aerosol formation from fines. Certain coating materials are not especially environmentally benign, however, and the coating material itself may represent a considerable added operational expense. For example, most conventional dust control products contain inorganic chloride salts, which are not particularly environmentally friendly and may lead to corrosion over time.

BRIEF DESCRIPTION OF THE DRAWINGS

Not applicable.

DETAILED DESCRIPTION

The present disclosure generally relates to functionalized saccharide polymers and, more specifically, functionalized saccharide polymers that may be effective for promoting fines mitigation and/or facilitating fluid purification, such as through froth flotation, particularly in mining operations and other activities where dust or other fines are prevalent and/or one or more contaminants are present within a fluid phase. The functionalized saccharide polymers disclosed herein may also be utilized as a component in treatment fluids for conducting subterranean operations, wherein they may afford benefits beyond just promoting fines control and facilitating contaminant removal. For example, the functionalized saccharide polymers may also be effective for promoting stabilization of clay-containing minerals in a subterranean formation when introduced thereto. Alternately, the functionalized saccharide polymers may promote at least partial dissolution of an acid-degradable mineral, for example.

As discussed above, contaminant removal and fines mitigation may be important in a variety of settings, such as in the mining industry. Current approaches for contaminant removal and fines mitigation may be less effective and more costly than desired. Some approaches using chemical agents may have an undesirable environmental profile and be overly expensive.

The present disclosure describes functionalized saccharide polymers that may be effective in various aspects for controlling fines and for promoting sequestration of contaminants from a fluid via frothing, such as metal contaminants. As such, the functionalized saccharide polymers disclosed herein may be particularly advantageous for use in conjunction with mining operations, since a common material may be applicable for addressing two frequent problematic aspects of a mining process. Although a common material may be used for addressing fines production and promoting sequestration of contaminants, as discussed further herein, the manner in which the functionalized saccharide polymers of the present disclosure are used for these purposes may differ considerably from one another. In particular, the functionalized saccharide polymers may be used in conjunction with froth flotation processes or related sedimentation processes to promote separation of contaminants from a fluid, such as separation of metal contaminants from clay-containing substances and other materials mixed within a fluid phase, including fluids liberated during mining operations. Removal of contaminants may increase the purity and value of a resource subjected to the purification process. When used for fines mitigation, an aqueous solution or dispersion of the functionalized saccharide polymers may be applied to the surface of a particulate material, especially a particulate material already containing fines, thereby forming a coating and limiting the ability of fines to become aerosolized. In another approach, an aqueous solution or dispersion of the functionalized saccharide polymers may be sprayed as a water curtain to cause settling of fines that have already become aerosolized. While the functionalized saccharide polymers of the present disclosure may be particularly useful in mining operations because they may address two problematic aspects thereof, they may be effectively used in any setting where providing contaminant sequestration (e.g., metal sequestration) and/or promoting dust control is desired.

The functionalized saccharide polymers of the present disclosure may promote frothing by themselves or when used in conjunction with conventional frothing agents for promoting froth flotation purification, particularly for removing contaminants associated with clay minerals. Without being bound by theory or mechanism, the functionalized saccharide polymers described herein are believed to limit swelling of clay minerals, thereby allowing more effective metals removal to be realized than when forming a froth using conventional frothing agents alone, numerous examples of which will be familiar to one having ordinary skill in the art. When contacted with an acid-degradable mineral, the functionalized saccharide polymers may likewise facilitate metal removal, optionally in combination with conventional frothing agents. At least partial dissolution of the acid-degradable mineral may promote metal release to aid this process. Thus, the functionalized saccharide polymers disclosed herein may allow enhanced performance of conventional frothing agents to be realized in addition to providing other benefits. The functionalized saccharide polymers of the present disclosure may also be produced at relatively low cost, thereby allowing more expensive conventional frothing agents to be used more effectively during a frothing operation and potentially lowering overall operational costs.

Advantageously, once contaminant separation has been performed with the aid of the functionalized saccharide polymers disclosed herein, the contaminant may be released from the separated froth or sediment, if desired, thereby allowing the contaminant to be recovered as an additional product stream, which may be valuable in its own right. For example, residual transition metals or rare earth metals separated from a mining product may be subsequently processed into a valuable resource, instead of being simply discarded as waste. In the case of metal isolation from a separated froth or sediment, the froth or sediment may be pyrolyzed to afford the corresponding metal oxides, which may then be further processed as needed. Acids may also be used to promote release of sequestered metals.

With respect to dust control, the functionalized saccharide polymers of the present disclosure do not contain significant quantities of inorganic chloride salts, thereby improving their environmental profile compared to conventional dust control agents. Moreover, the functionalized saccharide polymers of the present disclosure may represent a more cost-effective solution for promoting dust control compared to more aggressive engineering controls for addressing dust.

In addition to promoting contaminant sequestration and/or providing dust control, the functionalized saccharide polymers disclosed herein may also be effective for stabilizing clay-containing substances in various types of subterranean treatment operations. The crystalline structure of layered silicate clays can become mechanically unstable in the presence of water and hydraulically swell, sometimes forming a viscous fluid slurry and/or fines, which may deleteriously impact fluid flow within a subterranean formation and/or a wellbore penetrating a subterranean formation, or equipment associated therewith. Decreased fluid flow may undesirably lessen formation permeability and lead to reduced production. Conventional clay stabilizers containing inorganic salts, such as potassium chloride, may interact with a clay surface and promote ion-exchange and dewatering of the clay structure to increase stability; however, high concentrations of inorganic salts can be environmentally unfriendly to the wildlife and flora surrounding a drilling site, and disposal of such fluids may be problematic. In addition, high salt concentrations may impact the proper functioning of treatment fluids commonly introduced into a well bore, such as fracturing fluids and other gelled fluids. The functionalized saccharide polymers of the present disclosure may avoid these difficulties.

Alternately, the functionalized saccharide polymers may also promote at least partial dissolution of an acid-degradable mineral in a subterranean formation. Increased formation permeability and production of a hydrocarbon resource may occur as a result.

As such, the functionalized saccharide polymers of the present disclosure are a versatile material that may be advantageous in various respects compared to conventional substances utilized in numerous industrial settings. Compositions of the present disclosure may comprise a saccharide polymer comprising two or more monosaccharide units linked by glycosidic bonds and having a portion of the monosaccharide units oxidatively opened and functionalized with at least one aminocarboxylic acid bound through nitrogen at a site of oxidative opening. In a particular example, the functionalized saccharide polymers of the present disclosure may be formed by partial oxidation to open at least a portion of the monosaccharide rings, while leaving glycosidic bonds substantially intact, and forming at least one aldehyde at the site of oxidative opening. The at least one aldehyde may then be further reacted through reductive amination with an aminocarboxylic acid, such as glycine or other aminoalkylcarboxylic or arylaminocarboxylic acids (or a corresponding carboxylic acid derivative), to introduce at least one carboxylic acid group (or derivative of a carboxylic acid) bound through a N-linked carbon spacer at the site of oxidative opening. The N-linked carbon spacer arises from the aminocarboxylic acid (e.g., a hydrocarbyl portion of the aminocarboxylic acid). In the case of reductive amination with glycine, at least one carboxymethyl group may be present at the site of oxidative opening. Schemes 1 and 2, discussed further below, provide additional details regarding the partial oxidation and reductive amination processes and demonstrate how the functionalized saccharide polymers of the present disclosure may be produced.

As used herein, the term "partial oxidation" refers to oxidative opening of a monosaccharide unit with substantial retention of glycosidic bonds from a parent saccharide polymer.

As used herein, the term "aminocarboxylic acid" refers to either a free aminocarboxylic acid having the carboxylic acid group in a protonated form or an associated salt form, or an aminocarboxylic acid derivative having the carboxylic group in a derivative form, such as an ester form. Ester groups may undergo ready hydrolysis to form a free carboxylic acid after undergoing a reaction to form a functionalized saccharide polymer of the present disclosure. In either case, the amino group of the functionalized saccharide polymer may be in the free amine form or a corresponding protonated form. Thus, underivatized aminocarboxylic acids covalently bound at the site of oxidative opening in any embodiment herein may contain carboxylic acid groups in either a protonated form or a salt form and/or an amine group in either a free amine form or a protonated form.

Suitable saccharide polymers that may undergo functionalization according to the present disclosure may comprise a polysaccharide, according to some embodiments. Polysaccharides suitable for use in the present disclosure are environmentally safe, substantially nonhazardous to work with, and generally biocompatible. Polysaccharides and their functionalized forms may also be biodegradable and pose little to no threat to the environment, even when used in high concentrations. In addition, these materials may be sourced or produced at relatively low cost.

Suitable polysaccharides that may undergo functionalization according to the disclosure herein include, for example, levan, dextran, guar (guar gum), scleroglucan, welan, pullulan, xanthan (xanthan gum), schizophyllan, cellulose, pectin and any combination thereof. Dextran, levan, pectin and guar may be particularly desirable polysaccharides for use in forming functionalized saccharide polymers according to the disclosure herein. Derivative forms of the foregoing polysaccharides may be used as well. Pectin, for instance, is already used in froth flotation processes, and performance thereof may be further enhanced through use of the disclosure herein, either by forming a functionalized saccharide polymer from pectin according to the present disclosure or using pectin as a secondary frothing agent in combination with a functionalized saccharide polymer of the present disclosure. Guar derivatives suitable for use in the various embodiments of the present disclosure may include, for example, carboxyalkyl or hydroxyalkyl derivatives of guar, such as, for example, carboxymethyl guar, carboxymethylhydroxyethyl guar, hydroxyethyl guar, carboxymethylhydroxypropyl guar, ethyl carboxymethyl guar, and hydroxypropylmethyl guar. Suitable dextran and levan derivatives may similarly include, for example, carboxyalkyl or hydroxyalkyl derivatives of dextran or levan, such as, for example, carboxymethyl dextran (levan), carboxymethylhydroxyethyl dextran (levan), hydroxyethyl dextran (levan), carboxymethylhydroxypropyl dextran (levan), ethyl carboxymethyl dextran (levan), and hydroxypropylmethyl dextran (levan). These polysaccharide derivatives differ from the functionalized polysaccharides produced according to the present disclosure, since the carboxyalkyl group (e.g., a carboxymethyl group) is bound to an alcohol in conventional polysaccharide derivatives, whereas a carboxyalkyl group is bound through nitrogen (i.e., via an amine) at a site of oxidative opening in the present disclosure.

Dextran may be a particularly suitable polysaccharide for use in the disclosure herein. Dextran polysaccharide is characterized by a polymer backbone having predominantly $\alpha(1,6)$ glycosidic bonds between adjacent glucose units (monosaccharide units), with a limited number of glucose side chains linked to the main polymer backbone via $\alpha(1,3)$ glycosidic bonds. Depending on the biological source, the extent of branching may vary considerably in dextran and other polysaccharide polymers.

Starch is another suitable polysaccharide that may undergo functionalization according to the disclosure herein. Suitable starches may include, for example, an unmodified starch or a modified starch, such as an ionic starch, an oxidized starch, an ethoxylated starch, a hydroxyalkylated starch, a carboxylated starch, an aminated starch, the like or any combination thereof. Modified starches may be produced chemically through oxidation, acid thinning, chemical functionalization, enzymatic functionalization, or any combination thereof. Starches suitable for use in the disclosure herein may come from any plant source including, but not limited to, corn, potato, sweet potato, wheat, rice, sago, tapioca, waxy maize, sorghum, high amylose corn, or the like. Starches may be cooked (pre-gelatinized) or uncooked when functionalized according to the disclosure herein.

Polysaccharides suitable for use in the present disclosure may encompass a wide range of molecular weights. In illustrative embodiments, the molecular weight of suitable polysaccharides may range between about 1 million and about 50 million Daltons. In more specific embodiments, the polysaccharide molecular weight, particularly for dextrans and levans, may range between about 1 million and about 5 million Daltons, or between about 3 million and about 10 million Daltons, or between 5 million and about 10 million Daltons, or between 10 million and about 20 million Daltons, or between 20 million and about 30 million Daltons, or between 30 million and about 40 million Daltons, or between 40 million and about 50 million Daltons. Smaller polysaccharides may also be used as well.

In addition to polysaccharides, saccharide polymers suitable for use in the disclosure herein may comprise an oligosaccharide having 3 to about 20 monosaccharide units, or 3 to about 10 monosaccharide units. Accordingly, their molecular weight is much smaller than that of polysaccharides, typically in the range of about 3200 or lower, or about 1800 or lower. Oligosaccharides functionalized according to the present disclosure may afford similar advantages to those realizable with larger saccharide polymers (polysaccharides). Maltodextrin may be a particularly advantageous oligosaccharide for use in forming functionalized saccharide polymers of the present disclosure, particularly those suitable for performing froth flotation or a related contaminant separation technique and/or for mitigating fines. Maltodextrins, in contrast to dextrans and many other polysaccharides, contain a linear arrangement of glucose units (monosaccharide units) and the number of glycosidically linked glucose units is much lower.

Maltodextrins suitable for forming a functionalized saccharide polymer of the present disclosure may be obtained from hydrolysis or pyrolysis of starch, specifically the amylose component of starch, according to non-limiting embodiments. In addition to the number of glucose monomer units that are present, maltodextrins may be characterized in terms of their dextrose equivalent (DE) value. Dextrose equivalent is a measure of the amount of reducing sugars that are present in a saccharide oligomer, particularly a dextrin, expressed as a percentage relative to dextrose. Suitable maltodextrins may exhibit dextrose equivalent values ranging from 3 to about 20. Starch, which is functionally non-reducing, has a defined dextrose equivalent of 0, whereas dextrose itself has a dextrose equivalent of 100. Higher dextrose equivalent values are characteristic of a lower number of covalently linked glucose monomers (shorter polymer backbone length). In more specific embodiments, dextrose equivalent values of maltodextrins suitable for use in the disclosure herein may range from about 4.5 to about 7.0, or from about 7.0 to about 10.0, or from about 9.0 to about 12.0.

In any embodiment herein, functionalized polysaccharides and functionalized oligosaccharides may be used in combination with each other. In a particular example, partially oxidized dextran and partially oxidized maltodextrin, each functionalized with an aminocarboxylic acid such as glycine, may be used in combination with one another.

Aminocarboxylic acids that may be reacted to introduce a nitrogen-linked carboxylic acid group at a site of oxidative opening are not believed to be particularly limited. In one example, glycine may be reacted with an aldehyde at a site of oxidative opening under reductive amination conditions to introduce a carboxymethyl group. It is to be appreciated that other aminocarboxylic acids may be reacted similarly to introduce a larger hydrocarbyl group (alkyl or aryl group) between the carboxylic acid and the amine bound to the site of oxidative opening. Alternative aminocarboxylic acids that may be reacted similarly to glycine include, for example, aminoacetic acid, 3-aminopropionic acid, 4-aminobutyric acid (γ-aminobutyric acid), 5-aminopentanoic acid, 6-aminohexanoic acid, and p-aminobenzoic acid. It is to be appreciated that aminocarboxylic acids containing an amino group at a non-terminal carbon atom may be reacted similarly as well to introduce a branched hydrocarbyl group between the carboxylic acid and the amine bound to the site of oxidative opening. Aminocarboxylic acids containing secondary amines may likewise react under the reductive amination conditions to introduce a tertiary amine, also linked to the carboxylic acid, at the site of oxidative opening.

Oxidative opening may take place in about 1% up to 100% of the total monosaccharide units in a given saccharide polymer. In more particular examples, about 1% to about 30%, or about 30% to about 60%, or about 60% to about 90% of the total monosaccharide units in a given saccharide polymer may be oxidatively opened. Once functionalization with an aminocarboxylic acid takes place, the amount of aminocarboxylic acid may range from about 1 mole percent to about 70 mole percent per total moles of monosaccharide units, or about 1 mole percent to about 30 mole percent, or about 5 mole percent to about 50 mole percent, or about 10 mole percent to about 40 mole percent. Preferably, about 10 mole percent or more or about 20 mole percent or more of the total monosaccharide units may be functionalized with an aminocarboxylic acid according to the disclosure herein. As such, the functionalized saccharide polymers of the present disclosure may contain zero to two aminocarboxylic acid groups at each site of oxidative opening.

An effective aminocarboxylic acid loading range for promoting contaminant removal, mineral dissolution, and/or clay stabilization may include about 25 mole percent to about 75 mole percent aminocarboxylic acid per total moles of monosaccharide units. An effective aminocarboxylic acid loading range for dust control may include about 1 mole percent to about 50 mole percent aminocarboxylic acid per total moles of monosaccharide units. Accordingly, depending on application, the loading of aminocarboxylic acid per total moles of monosaccharide units may range from about 1 mole percent to about 75 mole percent, or about 5 mole percent to about 20 mole percent, or about 20 mole percent to about 40 mole percent, or about 40 mole percent to about 75 mole percent.

Compositions containing the functionalized saccharide polymers disclosed herein may further comprise water or a similar aqueous carrier fluid. The functionalized saccharide polymers may have a concentration in the aqueous carrier fluid ranging from about 1 wt. % to about 25 wt. %, or from about 5 wt. % to about 20 wt. %, or from about 5 wt. % to about 15 wt. 15%, or from about 5 wt. % to about 10 wt. %. The aqueous carrier fluid may be derived from any source including, for example, fresh water, salt water, sea water, ground water, flowback water, acidified water, aqueous salt solutions, brine, or the like. A water-miscible co-solvent, such as glycol or methanol, may be present in the aqueous carrier fluid in some cases.

The functionalized saccharide polymers of the present disclosure may be used in conjunction with subterranean operations such as, for example, excavation or mining. In particular, the functionalized saccharide polymers may be used in froth flotation processes conducted upon a mining product and/or provide dust control of fines generated during a mining process by spraying a coating comprising the functionalized saccharide polymers onto a mining product. Other dust control applications not associated with mining operations may also be applicable, as discussed further herein. In addition to promoting contaminant separation during froth flotation, such as metal separation, the functionalized saccharide polymers disclosed herein may also be applicable to sedimentation-based separation processes in some instances.

In other examples, the functionalized saccharide polymers of the present disclosure may be formulated as a subterranean treatment fluid configured for performing a specified action in a subterranean formation. Treatment fluids may be used in a variety of subterranean treatment operations to facilitate or promote a particular action within the subterranean formation. As used herein, the terms "treat," "treatment," "treating," and grammatical equivalents thereof refer to any subterranean operation that uses a fluid in conjunction with achieving a desired function and/or for a desired purpose. Unless otherwise specified, use of these terms does not imply any particular action by the treatment fluid or a component thereof. Illustrative treatment operations that may be facilitated through use of the functionalized saccharide polymers of the present disclosure include, without limitation, drilling operations, stimulation operations, production operations, remediation operations, sand control operations, and the like, which may include, for example, fracturing operations, gravel packing operations, acidizing operations, descaling operations, consolidation operations, workover operations, cleanup operations, and the like. In addition to offering the potential for promoting frothing or affording dust control, the functionalized saccharide polymers may fulfill various functions in a treatment fluid, including providing functionality as a surfactant and/or promoting stabilization of a clay-containing mineral. These functions may occur in conjunction with one or more other primary functions of the treatment fluid.

As used herein, the term "drilling operation" refers to the process of forming a wellbore in a subterranean formation. As used herein, the term "drilling fluid" refers to a fluid used in drilling a wellbore.

As used herein, the term "stimulation operation" refers to an activity conducted within a wellbore to increase production therefrom. As used herein, the term "stimulation fluid" refers to a fluid used downhole during a stimulation activity to increase production of a resource from the subterranean formation. In particular instances, stimulation fluids may include a fracturing fluid or an acidizing fluid.

As used herein, the terms "clean-up operation" or "damage control operation" refer to any operation for removing extraneous material from a wellbore to increase production. As used herein, the terms "clean-up fluid" or "damage control fluid" refer to a fluid used for removing an unwanted material from a wellbore that otherwise blocks flow of a desired fluid therethrough. In one example, a clean-up fluid can be an acidified fluid for removing material formed by one or more perforation treatments. In another example, a clean-up fluid can be used to remove a filter cake upon the wellbore walls.

As used herein, the term "fracturing operation" refers to a high-pressure operation that creates or extends a plurality of flow channels within a subterranean formation. As used herein, the term "fracturing fluid" refers to a viscosified fluid used in conjunction with a fracturing operation.

As used herein, the term "remediation operation" refers to any operation designed to maintain, increase, or restore a specific rate of production from a wellbore, which may include stimulation operations or clean-up operations. As used herein, the term "remediation fluid" refers to any fluid used in conjunction with a remediation operation.

As used herein, the term "acidizing operation" refers to any operation designed to remove an acid-soluble material from a wellbore, particularly an acid-soluble material that comprises at least a portion of the subterranean formation. As used herein, the term "acidizing fluid" refers to a fluid used during an acidizing operation.

As used herein, the term "spotting fluid" refers to a fluid designed for localized treatment of a subterranean formation. In one example, a spotting fluid can include a lost circulation material for treatment of a specific section of the wellbore, such as to seal off fractures in the wellbore and prevent sag. In another example, a spotting fluid can include a water control material or material designed to free a stuck piece of drilling or extraction equipment.

As used herein, the term "completion fluid" refers to a fluid used during the completion phase of a wellbore, including cementing compositions and cementing fluids.

As used herein, the term "cementing fluid" refers to a fluid used during cementing operations within a wellbore penetrating a subterranean formation.

The functionalized saccharide polymers of the present disclosure may be present in any of the treatment fluids discussed above. Treatment fluids of the present disclosure may feature a concentration of the functionalized saccharide polymers ranging from about 0.1 gallons per thousand gallons (gpt) to about 10 gpt, or from about 0.5 gpt to about 5 gpt, or from about 1 gpt to about 3 gpt. These concentrations correspond to volume/volume percentages ranging from about 0.01% to about 1%, or from about 0.05% to about 0.5%, or from 0.1% to about 0.3%. The chosen concentration may vary depending upon the particular requirements for a given treatment operation and/or the specific subterranean conditions that are encountered downhole.

Treatment fluids containing the functionalized saccharide polymers may optionally further comprise any number of additives, particularly those that are commonly used in the oilfield services industry. Illustrative additives that may be present in combination with the functionalized saccharide polymers of the present disclosure include, for example, surfactants, viscosifiers, gelling agents, gel stabilizers, antioxidants, polymer degradation prevention additives, relative permeability modifiers, scale inhibitors, corrosion inhibitors, chelating agents, foaming agents, defoaming agents, antifoaming agents, emulsifying agents, de-emulsifying agents, iron control agents, proppants or other particulates, particulate diverters, salts, acids, fluid loss control additives, gas, catalysts, other clay control agents, dispersants, flocculants, scavengers (e.g., $H_2S$ scavengers, $CO_2$ scavengers or $O_2$ scavengers), lubricants, breakers, friction reducers, bridging agents, weighting agents, solubilizers, pH control agents (e.g., buffers), hydrate inhibitors, consolidating agents, bactericides, catalysts, the like, and any combination thereof. Suitable examples of these additives will be familiar to one having ordinary skill in the art.

In some embodiments, the functionalized saccharide polymers may contact at least one fracture, an area surrounding a fracture, an area designated for fracturing, a flow pathway, an area surrounding a flow pathway, a wellbore surface, and/or a near wellbore surface. Stabilization of clay-containing minerals and/or mineral dissolution may occur in any of these locations. Suitable fluid diversion techniques may be utilized to place a treatment fluid containing the functionalized saccharide polymers in a given location, if needed.

In some embodiments, the functionalized saccharide polymers may be present in a primary treatment fluid introduced into a subterranean formation. In other embodiments, the functionalized saccharide polymers may be incorporated within a fluid pill or pad fluid introduced before a primary treatment fluid or between two primary treatment fluids. In some or other embodiments, functionalized saccharide polymers may be into a subterranean formation during drilling (i.e., in a drilling fluid) or during completion (e.g., in a cementing fluid).

In some embodiments, the functionalized saccharide polymers may be introduced into a subterranean formation in conjunction with a hydraulic fracturing operation. The fracturing operation may create or extend at least one fracture or flow pathway within the subterranean formation. Introducing or placing the functionalized saccharide polymers in the subterranean formation and the hydraulic fracturing operation may occur at any time with respect to one another. In some embodiments, the functionalized saccharide polymers may be present within a primary fracturing fluid, such that clay stabilization and/or mineral dissolution occurs concurrently with or after fracturing. In other embodiments, the functionalized saccharide polymers may be present in a pad fluid introduced into a subterranean formation before a primary fracturing fluid. The primary fracturing fluid may contain a proppant for maintaining fractures in an open condition, whereas the pad fluid generally does not contain proppant. In some instances, the functionalized saccharide polymer may be coated upon the surfaces of a plurality of proppant particulates.

In some or other embodiments, the functionalized saccharide polymers may be present in an acidizing fluid. Such acidizing fluids may include mineral acids or organic acids. Mineral acids may include acids such as hydrochloric acid, hydrobromic acid, or hydrofluoric acid, for example. Organic acids may include, for example, formic acid, acetic acid, trifluoroacetic acid, methanesulfonic acid, or trifluoromethane sulfonic acid. Sufficient amounts of the chosen acid may be present in the acidizing fluid to promote dissolution of an acid-soluble material (e.g., an acid-degradable mineral or an acid-degradable polymer) in a subterranean formation or wellbore. Again, the functionalized saccharide polymers may facilitate stabilization of clay minerals released during the acidizing process. Hydrofluoric acid, optionally in combination with one or more other mineral acids or organic acids, may be desirable for use in conjunction with acidizing a siliceous formation due to the ready dissolution of siliceous minerals afforded by this mineral acid.

As indicated above, the functionalized saccharide polymers disclosed herein may be produced through oxidative opening of a portion of the monosaccharide units in a parent saccharide polymer, which may be a polysaccharide, an oligosaccharide, or any combination thereof. The oxidative opening may be conducted with an oxidizing agent effective to afford at least one aldehyde group at a site of oxidative opening, preferably a dialdehyde, more preferably with substantial retention of glycosidic bonds taking place. The at least one aldehyde group may then undergo reductive amination with an aminocarboxylic acid to covalently bond the aminocarboxylic acid through nitrogen at a site of oxidative opening. In particular, an imine intermediate may be formed initially upon reacting the aldehyde with the aminocarboxylic acid and then undergo subsequent reduction to afford a carboxylic acid covalently bound to the site of oxidative opening through a secondary or tertiary amine. When two aldehyde groups are present at a site of oxidative opening, one or both of the aldehyde groups may be reacted with the aminocarboxylic acid. Any aldehyde groups that do not undergo a reaction with the aminocarboxylic acid may be reduced to a primary alcohol under the reductive amination conditions, wherein the primary alcohol is derived from a carbon atom of the oxidatively opened monosaccharide unit.

Periodate compounds, such as sodium periodate, are illustrative examples of oxidizing agents that are effective to react with a vicinal diol in a monosaccharide unit of a saccharide polymer and afford a dialdehyde upon oxidative opening of the monosaccharide unit. Advantageously, sodium periodate and other periodate compounds may perform the oxidative opening very selectively to form a dialdehyde at a site of oxidative opening. The glycosidic bonds in the parent saccharide polymer are preserved following oxidative opening of the monosaccharide units with this agent. After oxidative opening has taken place, the resulting dialdehyde may be contacted with the aminocarboxylic acid and a suitable reducing agent, such as sodium borohydride, to bond the aminocarboxylic acid covalently through nitrogen to the site of oxidative opening. Scheme 1 shows the sodium periodate oxidation and reductive amination reaction occurring in a section of an illustrative saccharide polymer.

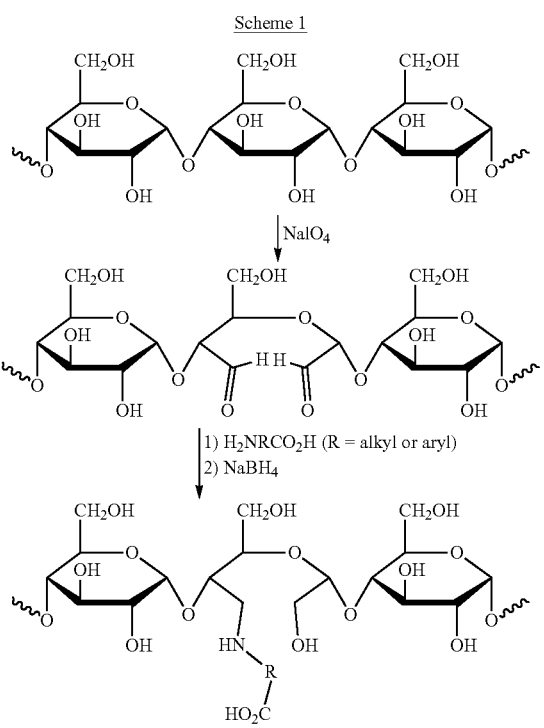

Scheme 1

Any aldehyde groups not reacted with the aminocarboxylic acid during reductive amination may undergo reduction to a primary alcohol under the reductive amination conditions. Sodium periodate may be reacted with the parent saccharide polymer in water at a temperature ranging from about −10° C. to about 25° C. Alternately, a mixture of water and a water-miscible organic solvent may be used, provided that the water-miscible organic solvent is non-reactive toward periodate. Although Scheme 1 shows the introduction of a single aminocarboxylic acid at the site of oxidative opening, it is to be appreciated that both carbon atoms may undergo functionalization in some instances, in which case the primary alcohol is no longer present at the site of oxidative opening. For sites of oxidative opening that do not undergo reaction with an aminocarboxylic acid at all, two primary alcohols may result at the site of oxidative opening following reductive amination.

Hydrogen peroxide, sodium hypochlorite, and sodium hypochlorite pentahydrate are also oxidizing agents that may be effective to form at least one aldehyde group at a site of oxidative opening. Although these reagents may be somewhat less selective for promoting partial oxidation than is sodium periodate, a dialdehyde may be formed at a site of oxidative opening in at least some instances. From an economic standpoint, sodium hypochlorite pentahydrate is a considerably less expensive oxidation reagent than is sodium periodate, and sodium hypochlorite and hydrogen peroxide are cheaper options still.

Sodium hypochlorite pentahydrate, for example, may afford multiple sites of oxidative opening, some of which contain a dialdehyde and others of which contain an aldehyde group and a carboxylic acid group. Unlike an aldehyde, the carboxylic acid group does not undergo reductive amination or reduction to a primary alcohol under reductive amination conditions, thereby leaving a carboxylic acid bound through nitrogen and a carboxylic acid derived from a carbon atom of the oxidatively opened monosaccharide unit at a site of oxidative opening following reductive amination. Scheme 2 shows the sodium hypochlorite pentahydrate oxidation and reductive amination reaction occurring in a section of an illustrative saccharide polymer, in which an aldehyde group and a carboxylic acid group are produced initially at the site of oxidative opening. It is to be appreciated that hydrogen peroxide, sodium hypochlorite, and sodium hypochlorite pentahydrate may alternately produce a dialdehyde at least at some sites of oxidative opening, in a manner similar to that shown above in Scheme 1.

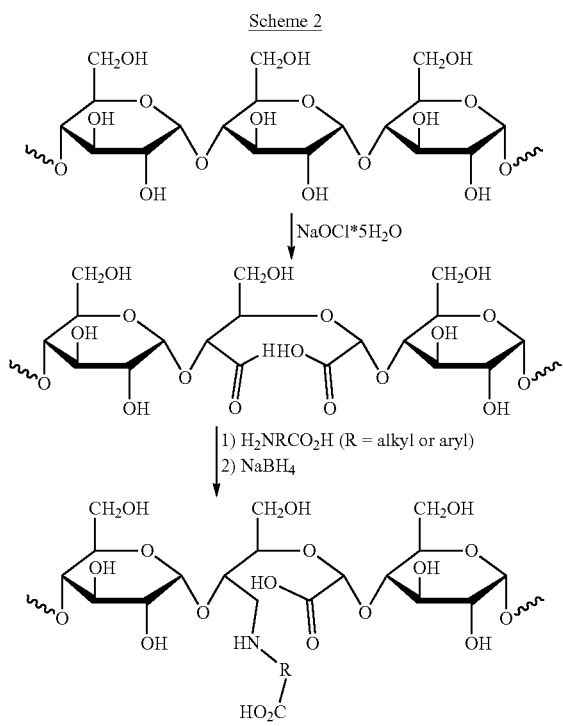

A limited amount of saccharide polymer oxidation occurring without opening of a monosaccharide unit may also take place with these reagents in some cases.

Aqueous sodium hypochlorite and aqueous sodium hypochlorite pentahydrate solutions may be distinguished from one another at least by differences in their pH. Commercial bleach solutions (aqueous sodium hypochlorite) typically have a pH above about 13, whereas aqueous sodium hypochlorite pentahydrate solutions may have a pH closer to about 10. Thus, sodium hypochlorite pentahydrate solutions may be advantageous for oxidizing saccharide polymers having sensitivity toward higher pH values. It is believed that aqueous sodium hypochlorite solutions may display comparable, but not identical, reactivity toward oxidative opening and particular vicinal diol stereoisomers in a monosaccharide unit.

Thus, particular examples of the functionalized saccharide polymers disclosed herein may include those having two aminocarboxylic acids covalently bound through nitrogen at the site of oxidative opening, or those in which one aminocarboxylic acid is covalently bound through nitrogen at the site of oxidative opening in combination with a primary alcohol or a carboxylic acid derived from a carbon atom of an oxidatively opened monosaccharide unit. In addition, the functionalized saccharide polymers may comprise one or more sites of oxidative opening that are not functionalized with an aminocarboxylic acid at all. Sites of oxidative opening that are not functionalized with an aminocarboxylic acid may instead contain two primary alcohols or a primary alcohol and a carboxylic acid, all derived from the oxidatively opened monosaccharide unit, following exposure to reductive amination conditions.

Accordingly, methods for forming functionalized saccharide polymers according to the present disclosure may comprise: exposing a saccharide polymer comprising two or more monosaccharide units linked by glycosidic bonds to an oxidizing agent; reacting the saccharide polymer with the oxidizing agent to form a site of oxidative opening bearing at least one aldehyde upon the saccharide polymer, the site of oxidative opening comprising an oxidatively opened monosaccharide unit; exposing the at least one aldehyde to an aminocarboxylic acid to form an imine intermediate at the site of oxidative opening; and reducing the imine intermediate to form a saccharide polymer with the at least one aminocarboxylic acid bound through nitrogen at the site of oxidative opening. In non-limiting examples, the oxidizing agent may comprise sodium periodate, hydrogen peroxide, sodium hypochlorite, sodium hypochlorite pentahydrate, or any combination thereof. Both polysaccharides and oligosaccharides may undergo such partial oxidation in the disclosure herein. Any of the polysaccharides and oligosaccharides mentioned above may be suitable in this regard. Likewise, any of the aforementioned aminocarboxylic acids may be suitable for functionalizing an oxidatively opened saccharide polymer in the foregoing manner.

As referenced above, the functionalized saccharide polymers of the present disclosure may be employed for promoting contaminant removal from a fluid by froth flotation, particularly metal contaminants arising from a clay-containing substance mixed with the fluid. Other substances, such as organic solids, may be removed in froth in some instances. Alternately, the functionalized saccharide polymers may be utilized in sedimentation processes, such as flocculation processes. In particular examples, methods for contaminant removal may comprise exposing a composition comprising a functionalized saccharide polymer of the present disclosure to a fluid in need of contaminant remediation, interacting the composition with at least one contaminant in the fluid to form a froth bearing at least a portion of the at least one contaminant separated from the fluid, and separating the froth from the fluid. Conventional frothing agents may be utilized in conjunction with the functionalized saccharide polymers (e.g., as a secondary frothing agent). Suitable techniques and equipment for performing a froth flotation separation will be familiar to one having ordinary skill in the art. Likewise, conventional frothing agents suitable for forming a froth will be familiar to one having ordinary skill in the art.

In a more particular example, the functionalized saccharide polymer may be interacted with a clay-containing substance, and a metal contaminant may be sequestered within the froth. The clay-containing substance may comprise a clay mineral, such as illite, smectite, kaolinite, or chlorite, for example. In some instances, the clay-containing substance may be obtained from a mining operation. In another particular example, the fluid in need of contaminant remediation may comprise bitumen or a mining product, such as a copper/gold mining product.

In some embodiments, the functionalized saccharide polymers may be interacted with an acid-degradable mineral. Illustrative acid-degradable minerals may include, for example, talc, dolomite, and other carbonate minerals. The carboxylic acid groups of the functionalized saccharide polymers may, by virtue of their acidity, at least partially convert such acid-degradable minerals into carbon dioxide and an inorganic salt. At least partial dissolution of an acid-degradable mineral may promote stimulation of a subterranean formation in some instances.

Any conventional frothing agent (secondary frothing agent), including organic flocculants, such as polyacrylamide derivatives, inorganic flocculants, such as aluminum salts and ferric salts, and biopolymers, such as chitosan, humic acid or alginates, may be used in combination with the functionalized saccharide polymers disclosed herein when performing a froth flotation. Other conventional neutral, cationic, or anionic secondary frothing agents may also be used in combination with the functionalized saccharide polymers in the disclosure herein. When used for promoting contaminant removal by froth flotation, an amount of the functionalized saccharide polymer may be sufficient to increase metal uptake in the froth by about 3 wt. % to about 5 wt. % relative to froth flotation conducted without the functionalized saccharide polymer being present.

Froth flotation may be used to separate metal contaminants from ore obtained from a mining operation, which may comprise one or more of soil, top soil, clay, rock or the like. During a froth flotation operation, water and frothing agents may be added to the mined ore, and air bubbles may be introduced in order to create a froth. Secondary frothing agents may be used in combination with the functionalized saccharide polymers to promote this process. Collectors effective to aid in metal sequestration may also be introduced with the frothing agents. Suitable collectors may modify the wetting properties of the surface of the mined ore to make metal sequestration more feasible. Hydrophobic particles comprising bound metal contaminants may become incorporated within the froth, which may then be skimmed off to form a concentrate laden in metals. The functionalized saccharide polymers described herein may further aid this process by preventing the clays from undergoing excessive swelling, thereby allowing the collectors to promote bonding of the metal(s) for separation within the froth.

After separating the froth from the substance in need of contaminant remediation, one or more metals may be recovered from the froth, if desired. For example, the metals within a froth may be processed into a form more suitable for waste disposal. Alternately, recovered metals may be reprocessed and sold as a value component. For example, once separated from a fluid in need of contaminant remediation, rare earth metals or other precious or semi-precious metals may be reprocessed and sold. In a non-limiting example, metal recovery from a froth may take place by a pyrolysis process, followed by recovery of one or more metal oxides from the resulting pyrolysis residue. Acid treatment may also be used to promote metal recovery in some instances, optionally accompanied by precipitation of an insoluble metal salt. Additional separation of metals or metal oxides from each other may take place following separation from a froth. Such additional separation may take place using techniques familiar to persons having ordinary skill in the art.

Contaminants other than metals may also be separated by frothing according to the disclosure herein. In non-limiting examples, hydrophobic organic particles, such as lipid particles, may be sequestered in a froth containing a functionalized saccharide polymer of the present disclosure.

The functionalized saccharide polymers disclosed herein may also be employed advantageously in a wide array of applications in which particulate materials are used, especially those in which dust control and mitigation of other issues associated with fines are desirable. In addition, the desirable properties afforded by the functionalized polysaccharides themselves can further enhance certain types of applications as well. Several illustrative applications are described in brief hereinafter, any of which may be advantageously conducted using the functionalized saccharide polymers of the present disclosure as a coating for particulate materials.

When used for controlling dust and mitigating the presence of fines, compositions comprising a functionalized saccharide polymer of the present disclosure may be exposed to a plurality of particulates, and form a coating comprising the functionalized saccharide polymer upon a surface of at least a portion of the plurality of particulates. In more specific examples, exposing the plurality of particulates to the functionalized saccharide polymer may comprise spraying a composition comprising the functionalized saccharide polymer upon the plurality of particulates. The composition may be sprayed upon the plurality of particulates before fines have become aerosolized, or the composition may be sprayed onto aerosolized particulates to promote settling thereof. For example, the composition may be sprayed as a water curtain, such as within proximity to a mining operation, to limit the distance that aerosolized fines may travel. The functionalized saccharide polymers may be particularly beneficial for providing dust control for a plurality of particulates formed during a mining operation. A coating formed from the functionalized saccharide polymers upon a particulate surface may decrease the amount of dust formed from the plurality of particulates during the mining operation.

Beyond mining operations, the functionalized saccharide polymers of the present disclosure may also be utilized in other processes in which a plurality of particulates may generate dust. The functionalized saccharide polymers of the present disclosure may be coated onto the surface of a base particulate material in some embodiments of the present disclosure. Suitable base particulate materials that may be coated with the functionalized saccharide polymers include, for example, a clay material, such as vermiculite, montmorillonite or bentonite. Other suitable base particulate materials may comprise wood products, including shavings, sawdust, bark, chips, or the like, one or more of which may be compressed together in a pellet in some applications. Processed wood particulate materials such as charcoal particulates, for example, may also be suitably coated with the functionalized saccharide polymers disclosed herein. Coated animal litter products may also be formed according to the disclosure herein. Coating of any of the foregoing may be effective for decreasing the amount of dust formed from the particulate materials during their handling and use.

In another particular example, the functionalized saccharide polymers may be disposed as a coating upon proppant particulates used in a fracturing operation. The coating may aid in limiting dust formed from proppant fines during handling and transport. In addition, the functionalized saccharide polymers may exert beneficial effects downhole, such as for imparting surfactant properties or promoting clay stabilization. The functionalized saccharide polymers may impart similar surfactant properties or promote clay stabilization effects in a treatment fluid when not disposed upon a particulate material as well.

Embodiments disclosed herein include:

A. Compositions comprising functionalized polysaccharides. The compositions comprise: a saccharide polymer comprising two or more monosaccharide units linked by glycosidic bonds and having a portion of the monosaccharide units oxidatively opened and functionalized with at least one aminocarboxylic acid covalently bound through nitrogen at a site of oxidative opening. Optionally, the compositions may comprise the functionalized saccharide polymer disposed upon the surface of a particulate material.

B. Methods for making functionalized polysaccharides. The methods comprise: exposing a saccharide polymer comprising two or more monosaccharide units linked by glycosidic bonds to an oxidizing agent; reacting the saccharide polymer with the oxidizing agent to form a site of oxidative opening bearing at least one aldehyde upon the saccharide polymer, the site of oxidative opening comprising an oxidatively opened monosaccharide unit; exposing the at least one aldehyde to an aminocarboxylic acid to form an imine intermediate at the site of oxidative opening; and reducing the imine intermediate to form a saccharide polymer having the at least one aminocarboxylic acid bound through nitrogen at the site of oxidative opening.

C. Froth flotation methods. The methods comprise: exposing the composition of A to a fluid in need of contaminant remediation; interacting the composition with at least one contaminant in the fluid to form a froth; and separating the froth from the fluid.

D. Dust control methods. The methods comprise: exposing the composition of A to a plurality of particulates; and forming a coating comprising the saccharide polymer on at least a portion of the plurality of particulates.

E. Clay stabilization methods. The methods comprise: introducing the composition of claim 1 into a subterranean formation bearing a clay-containing mineral; and interacting the saccharide polymer with the clay-containing mineral to promote stabilization thereof. Optionally, the compositions may comprise the functionalized saccharide polymer disposed upon the surface of a particulate material when introduced to the subterranean formation.

Embodiments A-E may have one or more of the following additional elements in any combination.

Element 1: wherein the at least one aminocarboxylic acid comprises glycine.

Element 2: wherein the saccharide polymer comprises at least one polysaccharide selected from the group consisting of a dextran, a levan, a pectin, a guar, and any combination thereof.

Element 3: wherein the saccharide polymer comprises an oligosaccharide having 3 to about 20 monosaccharide units.

Element 4: wherein the saccharide polymer further comprises an oligosaccharide having 3 to about 20 monosaccharide units.

Element 5: wherein the oligosaccharide comprises maltodextrin.

Element 6: wherein the composition further comprises an aqueous carrier fluid.

Element 7: wherein two aminocarboxylic acids are covalently bound through nitrogen at the site of oxidative opening, or one aminocarboxylic acid is covalently bound through nitrogen at the site of oxidative opening in combination with a primary alcohol or a carboxylic acid derived from a carbon atom of an oxidatively opened monosaccharide unit.

Element 8: wherein the saccharide polymer comprises one or more sites of oxidative opening that are not functionalized with the aminocarboxylic acid.

Element 9: wherein the oxidizing agent comprises sodium periodate.

Element 10: wherein the oxidizing agent comprises hydrogen peroxide, sodium hypochlorite, sodium hypochlorite pentahydrate, or any combination thereof.

Element 11: wherein a clay-containing substance, an acid-degradable substance, or any combination thereof is present in the fluid.

Element 12: wherein the clay-containing substance, an acid-degradable substance, or any combination thereof is obtained from a mining operation.

Element 13: wherein the clay-containing substance comprises bitumen or a copper/gold mining product, and/or the acid-degradable substance comprises talc, a carbonate mineral, dolomite, or any combination thereof.

Element 14: wherein the at least one contaminant comprises at least one metal.

Element 15: wherein the method further comprises recovering one or more metals from the froth.

Element 16: wherein the composition is interacted with the at least one contaminant in the presence of a secondary frothing agent.

Element 17: wherein the plurality of particulates is formed during a mining operation.

Element 18: wherein the coating decreases an amount of dust formed from the plurality of particulates.

Element 19: wherein the composition is sprayed onto a portion of the plurality of particulates that has been aerosolized.

Element 20: wherein the subterranean formation comprises a shale formation.

By way of non-limiting example, exemplary combinations applicable to A-E include, but are not limited to, 1 and 2; 1 and 3; 1, 2 and 4; 1, 3 and 5; 1, 2, 4 and 5; 1 and 6; 1 and 7; 1 and 8; 2 and 3; 2 and 4; 2, 3 and 5; 2, 4 and 5; 2 and 6; 2 and 7; 2 and 8; 3 and 5; 3 and 6; 3 and 7; 3 and 8; 6 and 7; 6 and 8; and 7 and 8, any of which may be in further combination with one or more of 10-20.

Additional embodiments disclosed herein include:

Embodiment 1. A composition comprising:
a saccharide polymer comprising two or more monosaccharide units linked by glycosidic bonds and having a portion of the monosaccharide units oxidatively opened and functionalized with at least one aminocarboxylic acid covalently bound through nitrogen at a site of oxidative opening.

Embodiment 2. The composition of embodiment 1, wherein the at least one aminocarboxylic acid comprises glycine.

Embodiment 3. The composition of embodiment 1 or embodiment 2, wherein the saccharide polymer comprises at least one polysaccharide selected from the group consisting of a dextran, a levan, a pectin, a guar, and any combination thereof.

Embodiment 4. The composition of embodiment 3, wherein the saccharide polymer further comprises an oligosaccharide having 3 to about 20 monosaccharide units.

Embodiment 5. The composition of embodiment 1 or embodiment 2, wherein the saccharide polymer comprises an oligosaccharide having 3 to about 20 monosaccharide units.

Embodiment 6. The composition of embodiment 4 or embodiment 5, wherein the oligosaccharide comprises maltodextrin.

Embodiment 7. The composition of any one of embodiments 1-6, further comprising:
an aqueous carrier fluid.

Embodiment 8. The composition of any one of embodiments 1-7, wherein two aminocarboxylic acids are covalently bound through nitrogen at the site of oxidative opening, or one aminocarboxylic acid is covalently bound through nitrogen at the site of oxidative opening in combination with a primary alcohol or a carboxylic acid derived from a carbon atom of an oxidatively opened monosaccharide unit.

Embodiment 9. The composition of any one of embodiments 1-8, wherein the saccharide polymer comprises one or more sites of oxidative opening that are not functionalized with the aminocarboxylic acid.

Embodiment 10. A method comprising:
 exposing a saccharide polymer comprising two or more monosaccharide units linked by glycosidic bonds to an oxidizing agent;
 reacting the saccharide polymer with the oxidizing agent to form a site of oxidative opening bearing at least one aldehyde upon the saccharide polymer, the site of oxidative opening comprising an oxidatively opened monosaccharide unit;
 exposing the at least one aldehyde to an aminocarboxylic acid to form an imine intermediate at the site of oxidative opening; and
 reducing the imine intermediate to form a saccharide polymer having the at least one aminocarboxylic acid bound through nitrogen at the site of oxidative opening.

Embodiment 11. The method of embodiment 10, wherein the at least one aminocarboxylic acid comprises glycine.

Embodiment 12. The method of embodiment 10 or embodiment 11, wherein the saccharide polymer comprises at least one polysaccharide selected from the group consisting of a dextran, a levan, a pectin, a guar, and any combination thereof.

Embodiment 13. The method of embodiment 12, wherein the saccharide polymer further comprises an oligosaccharide having 3 to about 20 monosaccharide units.

Embodiment 14. The method of embodiment 10 or embodiment 11, wherein the saccharide polymer comprises an oligosaccharide having 3 to about 20 monosaccharide units.

Embodiment 15. The method of embodiment 13 or embodiment 14, wherein the oligosaccharide comprises maltodextrin.

Embodiment 16. The method of any one of embodiments 10-15, wherein two aminocarboxylic acids are covalently bound through nitrogen at the site of oxidative opening, or one aminocarboxylic acid is covalently bound through nitrogen at the site of oxidative opening in combination with a primary alcohol or a carboxylic acid derived from a carbon atom of an oxidatively opened monosaccharide unit.

Embodiment 17. The method of any one of embodiments 10-16, wherein the saccharide polymer comprises one or more sites of oxidative opening that are not functionalized with the aminocarboxylic acid.

Embodiment 18. The method of any one of embodiments 10-17, wherein the oxidizing agent comprises sodium periodate.

Embodiment 19. The method of any one of embodiments 10-17, wherein the oxidizing agent comprises hydrogen peroxide, sodium hypochlorite, sodium hypochlorite pentahydrate, or any combination thereof.

Embodiment 20. A method comprising:
 exposing the composition of embodiment 1 to a fluid in need of contaminant remediation;
 interacting the composition with at least one contaminant in the fluid to form a froth; and
 separating the froth from the fluid.

Embodiment 21. The method of embodiment 20, wherein a clay-containing substance, an acid-degradable substance, or any combination thereof is present in the fluid.

Embodiment 22. The method of embodiment 21, wherein the clay-containing substance, the acid-degradable substance, or any combination thereof is obtained from a mining operation.

Embodiment 23. The method of embodiment 21 or embodiment 22, wherein the clay-containing substance comprises bitumen or a copper/gold mining product, and/or the acid-degradable substance comprises talc, a carbonate mineral, dolomite, or any combination thereof.

Embodiment 24. The method of any one of embodiments 20-23, wherein the at least one contaminant comprises at least one metal.

Embodiment 25. The method of any one of embodiments 20-24, further comprising:
 recovering one or more metals from the froth.

Embodiment 26. The method of any one of embodiments 20-25, wherein the composition is interacted with the at least one contaminant in the presence of a secondary frothing agent.

Embodiment 27. The method of any one of embodiments 20-26, wherein the at least one aminocarboxylic acid comprises glycine.

Embodiment 28. The method of any one of embodiments 20-27, wherein the saccharide polymer comprises at least one polysaccharide selected from the group consisting of a dextran, a levan, a pectin, a guar, and any combination thereof.

Embodiment 29. The method of embodiment 28, wherein the saccharide polymer further comprises an oligosaccharide having 3 to about 20 monosaccharide units.

Embodiment 30. The method of any one of embodiments 20-27, wherein the saccharide polymer comprises an oligosaccharide having 3 to about 20 monosaccharide units.

Embodiment 31. The method of embodiment 29 or embodiment 30, wherein the oligosaccharide comprises maltodextrin.

Embodiment 32. The method of any one of embodiments 20-31, wherein two aminocarboxylic acids are covalently bound through nitrogen at the site of oxidative opening, or one aminocarboxylic acid is covalently bound through nitrogen at the site of oxidative opening in combination with a primary alcohol or a carboxylic acid derived from a carbon atom of an oxidatively opened monosaccharide unit.

Embodiment 33. The method of any one of embodiments 20-32, wherein the saccharide polymer comprises one or more sites of oxidative opening that are not functionalized with the aminocarboxylic acid.

Embodiment 34. A method comprising:
 exposing the composition of embodiment 1 to a plurality of particulates; and
 forming a coating comprising the saccharide polymer on at least a portion of the plurality of particulates.

Embodiment 35. The method of embodiment 34, wherein the plurality of particulates is formed during a mining operation.

Embodiment 36. The method of embodiment 34 or embodiment 35, wherein the coating decreases an amount of dust formed from the plurality of particulates.

Embodiment 37. The method of any one of embodiments 34-36, wherein the composition is sprayed onto a portion of the plurality of particulates that has been aerosolized.

Embodiment 38. The method of any one of embodiments 34-37, wherein the at least one aminocarboxylic acid comprises glycine.

Embodiment 39. The method of any one of embodiments 34-38, wherein the saccharide polymer comprises at least one polysaccharide selected from the group consisting of a dextran, a levan, a pectin, a guar, and any combination thereof.

Embodiment 40. The method of embodiment 39, wherein the saccharide polymer further comprises an oligosaccharide having 3 to about 20 monosaccharide units.

Embodiment 41. The method of any one of embodiments 34-38, wherein the saccharide polymer comprises an oligosaccharide having 3 to about 20 monosaccharide units.

Embodiment 42. The method of embodiment 40 or embodiment 41, wherein the oligosaccharide comprises maltodextrin.

Embodiment 43. The method of any one of embodiments 34-42, wherein two aminocarboxylic acids are covalently bound through nitrogen at the site of oxidative opening, or one aminocarboxylic acid is covalently bound through nitrogen at the site of oxidative opening in combination with a primary alcohol or a carboxylic acid derived from a carbon atom of an oxidatively opened monosaccharide unit.

Embodiment 44. The method of any one of embodiments 34-43, wherein the saccharide polymer comprises one or more sites of oxidative opening that are not functionalized with the aminocarboxylic acid.

Embodiment 45. A method comprising:
  introducing the composition of embodiment 1 into a subterranean formation bearing a clay-containing mineral; and
  interacting the saccharide polymer with the clay-containing mineral to promote stabilization thereof.

Embodiment 46. The method of embodiment 45, wherein the subterranean formation comprises a shale formation.

Embodiment 47. The method of embodiment 45 or embodiment 46, wherein the at least one aminocarboxylic acid comprises glycine.

Embodiment 48. The method of any one of embodiments 45-47, wherein the saccharide polymer comprises at least one polysaccharide selected from the group consisting of a dextran, a levan, a pectin, a guar, and any combination thereof.

Embodiment 49. The method of embodiment 48, wherein the saccharide polymer further comprises an oligosaccharide having 3 to about 20 monosaccharide units.

Embodiment 50. The method of any one of embodiments 45-47, wherein the saccharide polymer comprises an oligosaccharide having 3 to about 20 monosaccharide units.

Embodiment 51. The method of embodiment 49 or embodiment 50, wherein the oligosaccharide comprises maltodextrin.

Embodiment 52. The method of any one of embodiments 45-51, wherein two aminocarboxylic acids are covalently bound through nitrogen at the site of oxidative opening, or one aminocarboxylic acid is covalently bound through nitrogen at the site of oxidative opening in combination with a primary alcohol or a carboxylic acid derived from a carbon atom of an oxidatively opened monosaccharide unit.

Embodiment 53. The method of any one of embodiments 45-52, wherein the saccharide polymer comprises one or more sites of oxidative opening that are not functionalized with the aminocarboxylic acid.

Unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating various features are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While various systems, tools and methods are described herein in terms of "comprising" various components or steps, the systems, tools and methods can also "consist essentially of" or "consist of" the various components and steps.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Therefore, the disclosed systems, tools and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems, tools and methods illustratively disclosed herein may suitably be practiced in the absence of any element that is not specifically disclosed herein and/or any optional element disclosed herein. While systems, tools and methods are described in terms of "comprising," "containing," or "including" various components or steps, the systems, tools and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is the following:

1. A composition comprising:
a saccharide polymer comprising two or more monosaccharide units linked by glycosidic bonds and having a portion of the monosaccharide units oxidatively opened and functionalized with at least one aminocarboxylic acid covalently bound through nitrogen at a site of oxidative opening.

2. The composition of claim 1, wherein the at least one aminocarboxylic acid comprises glycine.

3. The composition of claim 1, wherein the saccharide polymer comprises at least one polysaccharide selected from the group consisting of a dextran, a levan, a pectin, a guar, and any combination thereof.

4. The composition of claim 1, wherein the saccharide polymer comprises an oligosaccharide having 3 to about 20 monosaccharide units.

5. The composition of claim 1, further comprising:
an aqueous carrier fluid.

6. The composition of claim 1, wherein two aminocarboxylic acids are covalently bound through nitrogen at the site of oxidative opening, or one aminocarboxylic acid is covalently bound through nitrogen at the site of oxidative opening in combination with a primary alcohol or a carboxylic acid derived from a carbon atom of an oxidatively opened monosaccharide unit.

7. The composition of claim 1, wherein the saccharide polymer comprises one or more sites of oxidative opening that are not functionalized with the aminocarboxylic acid.

8. A method comprising:
exposing a saccharide polymer comprising two or more monosaccharide units linked by glycosidic bonds to an oxidizing agent;
reacting the saccharide polymer with the oxidizing agent to form a site of oxidative opening bearing at least one aldehyde upon the saccharide polymer, the site of oxidative opening comprising an oxidatively opened monosaccharide unit;
exposing the at least one aldehyde to an aminocarboxylic acid to form an imine intermediate at the site of oxidative opening; and
reducing the imine intermediate to form a saccharide polymer having the at least one aminocarboxylic acid bound through nitrogen at the site of oxidative opening.

9. The method of claim 8, wherein the at least one aminocarboxylic acid comprises glycine.

10. The method of claim 8, wherein the saccharide polymer comprises at least one polysaccharide selected from the group consisting of a dextran, a levan, a pectin, a guar, and any combination thereof.

11. The method of claim 8, wherein the saccharide polymer comprises an oligosaccharide having 3 to about 20 monosaccharide units.

12. The method of claim 8, wherein two aminocarboxylic acids are covalently bound through nitrogen at the site of oxidative opening, or one aminocarboxylic acid is covalently bound through nitrogen at the site of oxidative opening in combination with a primary alcohol or a carboxylic acid derived from a carbon atom of an oxidatively opened monosaccharide unit.

13. The method of claim 8, wherein the oxidizing agent comprises sodium periodate.

14. A method comprising:
exposing the composition of claim 1 to a fluid in need of contaminant remediation;
interacting the composition with at least one contaminant in the fluid to form a froth; and
separating the froth from the fluid.

15. The method of claim 14, wherein a clay-containing substance, an acid-degradable substance, or any combination thereof is present in the fluid.

16. The method of claim 15, wherein the clay-containing substance, the acid-degradable substance, or any combination thereof is obtained from a mining operation.

17. The method of claim 15, wherein the clay-containing substance comprises bitumen or a copper/gold mining product, and/or the acid-degradable substance comprises talc, a carbonate mineral, dolomite, or any combination thereof.

18. The method of claim 14, wherein the at least one contaminant comprises at least one metal.

19. The method of claim 14, further comprising:
recovering one or more metals from the froth.

20. The method of claim 14, wherein the composition is interacted with the at least one contaminant in the presence of a secondary frothing agent.

* * * * *